US012689886B2

(12) United States Patent
Sharma et al.

(10) Patent No.: US 12,689,886 B2
(45) Date of Patent: Jul. 21, 2026

(54) UNIFIED DATA REGISTRY (UDR) SYNCHRONIZATION IN A WIRELESS COMMUNICATION NETWORK

(71) Applicant: T-MOBILE INNOVATIONS LLC, Overland Park, KS (US)

(72) Inventors: Anuj Sharma, Broadlands, VA (US); Kumar Pushkar, Herndon, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 447 days.

(21) Appl. No.: 18/499,582

(22) Filed: Nov. 1, 2023

(65) Prior Publication Data

US 2025/0142317 A1     May 1, 2025

(51) Int. Cl.
*H04W 8/18*          (2009.01)
*H04W 8/20*          (2009.01)
*H04W 8/26*          (2009.01)
*H04W 24/04*         (2009.01)

(52) U.S. Cl.
CPC ............. *H04W 8/186* (2013.01); *H04W 8/18* (2013.01); *H04W 8/20* (2013.01); *H04W 8/26* (2013.01); *H04W 24/04* (2013.01)

(58) Field of Classification Search
CPC ......... H04W 8/186; H04W 8/26; H04W 8/20; H04W 24/04; H04W 8/18
See application file for complete search history.

(56) References Cited

U.S. PATENT DOCUMENTS 10,003,965 B2     6/2018  Koshimizu et al.
10,405,173 B1 *   9/2019  Holmes ................. H04W 8/186

11,096,046 B2     8/2021  Li et al.
11,272,329 B2 *   3/2022  Bowman ................. H04L 51/04
11,412,418 B2     8/2022  Qiao et al.
11,700,516 B2 *   7/2023  Mariyani ................ H04W 8/02
                                              455/418
12,185,420 B2 *  12/2024  Sathyanarayanamurthy ..............
                                              H04W 8/18
2005/0065977 A1 * 3/2005  Benson ................... G06F 16/27
2008/0133929 A1 * 6/2008  Gehrmann .............. G06F 21/51
                                              713/179

(Continued)

FOREIGN PATENT DOCUMENTS

WO        2023144035 A1     8/2023

*Primary Examiner* — Dominic E Rego

(57)                ABSTRACT

Various embodiments comprise a wireless communication network to synchronize Unified Data Registries (UDRs) during data migration. In some examples, the wireless communication network comprises a provisioning orchestrator, UDR provisioning controllers, and a migration controller. The provisioning orchestrator receives an update for a subscriber profile, determines the subscriber profile has been migrated to the second UDR based on the subscriber Identifier (ID), and directs the second UDR provisioning controller to implement the provisioning data update. The second UDR provisioning controller updates the subscriber profile stored on the second UDR and triggers a synchronization update on the first UDR. The data migration controller detects the trigger and audits the first UDR to identify a subscription alias for the subscriber profile. The migration controller directs the first UDR provisioning controller to update the alias. The first UDR provisioning controller updates the alias to synchronize the first UDR with the second UDR.

20 Claims, 10 Drawing Sheets

100 ➔

(56)        References Cited

U.S. PATENT DOCUMENTS

2011/0225281 A1*   9/2011  Riley ................... H04M 15/00
                                         709/223
2015/0181549 A1*   6/2015  Batada ................. H04W 4/33
                                         455/456.1
2017/0308881 A1*  10/2017  Gravallon ............. G06Q 20/20
2019/0132727 A1*   5/2019  Shekhar ............... H04W 8/04
2020/0178062 A1*   6/2020  Bartolomé Rodrigo ...................
                                         H04W 60/04
2021/0153009 A1*   5/2021  Patil ................... H04W 12/037
2022/0060897 A1*   2/2022  Bartolomé Rodrigo ...................
                                         H04W 60/00
2022/0201462 A1*   6/2022  Sridharan ............. H04W 8/18
2022/0303753 A1*   9/2022  Zhu ..................... H04W 8/08
2022/0312158 A1    9/2022  Gonzalez et al.
2023/0171587 A1*   6/2023  Merino Vazquez .......................
                                         H04L 65/1063
                                         455/422.1
2024/0244421 A1*   7/2024  Kuravangi-Thammaiah ..............
                                         H04W 8/18
2024/0292204 A1*   8/2024  Kuravangi-Thammaiah ..............
                                         H04W 8/18
2024/0397344 A1*  11/2024  Fitzmaurice ......... H04W 24/02
2025/0080524 A1*   3/2025  Balin .................. H04L 63/083
2025/0142660 A1*   5/2025  Ross .................. H04W 68/005

* cited by examiner

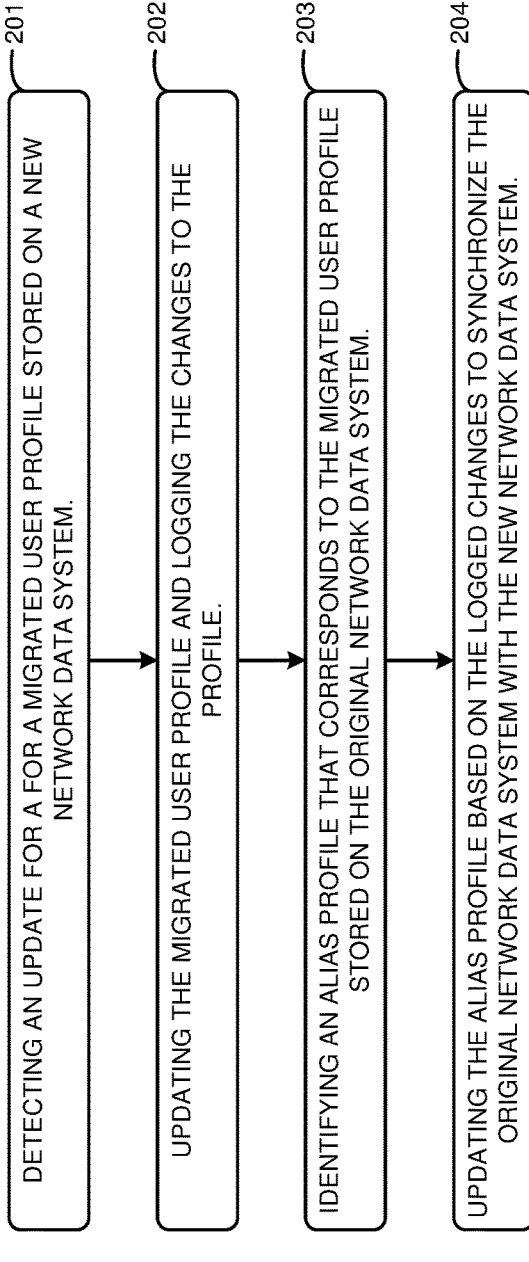

201 — DETECTING AN UPDATE FOR A FOR A MIGRATED USER PROFILE STORED ON A NEW NETWORK DATA SYSTEM.

202 — UPDATING THE MIGRATED USER PROFILE AND LOGGING THE CHANGES TO THE PROFILE.

203 — IDENTIFYING AN ALIAS PROFILE THAT CORRESPONDS TO THE MIGRATED USER PROFILE STORED ON THE ORIGINAL NETWORK DATA SYSTEM.

204 — UPDATING THE ALIAS PROFILE BASED ON THE LOGGED CHANGES TO SYNCHRONIZE THE ORIGINAL NETWORK DATA SYSTEM WITH THE NEW NETWORK DATA SYSTEM.

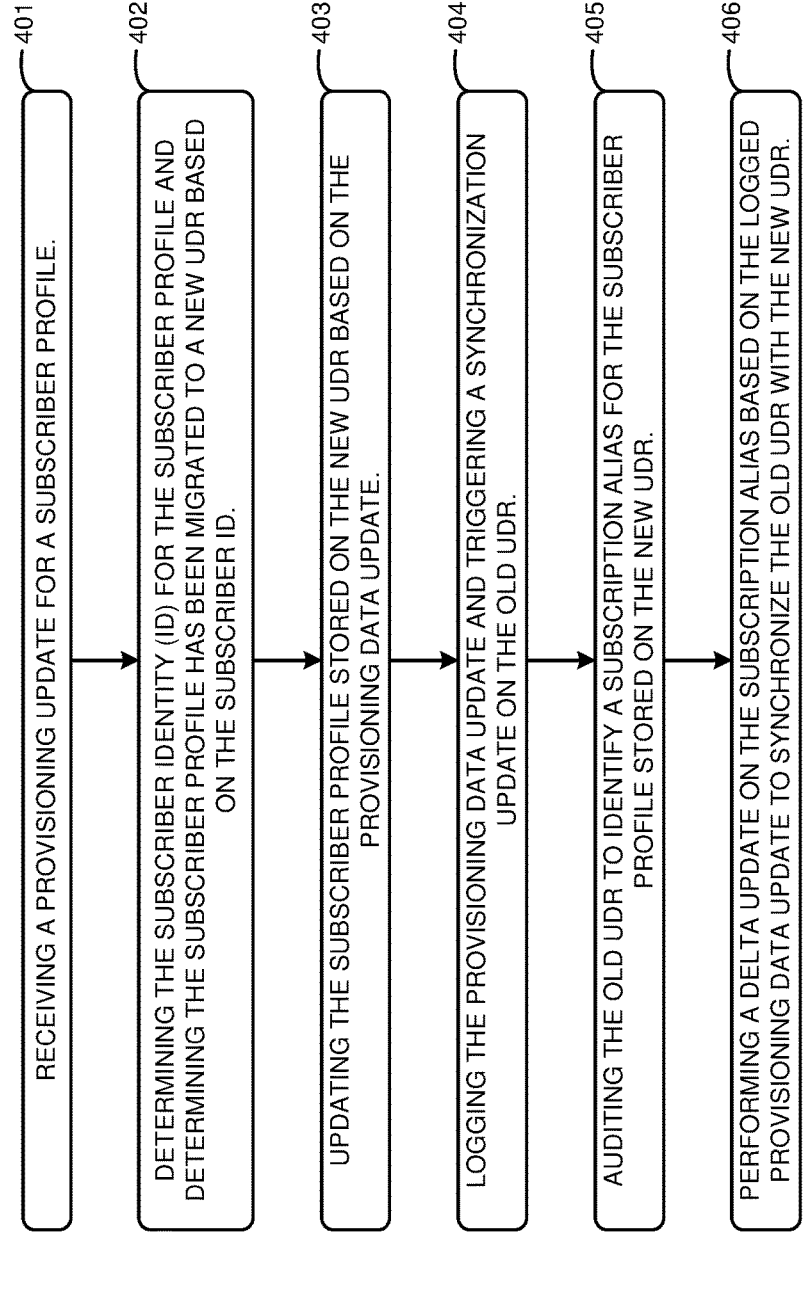

401 RECEIVING A PROVISIONING UPDATE FOR A SUBSCRIBER PROFILE.

402 DETERMINING THE SUBSCRIBER IDENTITY (ID) FOR THE SUBSCRIBER PROFILE AND DETERMINING THE SUBSCRIBER PROFILE HAS BEEN MIGRATED TO A NEW UDR BASED ON THE SUBSCRIBER ID.

403 UPDATING THE SUBSCRIBER PROFILE STORED ON THE NEW UDR BASED ON THE PROVISIONING DATA UPDATE.

404 LOGGING THE PROVISIONING DATA UPDATE AND TRIGGERING A SYNCHRONIZATION UPDATE ON THE OLD UDR.

405 AUDITING THE OLD UDR TO IDENTIFY A SUBSCRIPTION ALIAS FOR THE SUBSCRIBER PROFILE STORED ON THE NEW UDR.

406 PERFORMING A DELTA UPDATE ON THE SUBSCRIPTION ALIAS BASED ON THE LOGGED PROVISIONING DATA UPDATE TO SYNCHRONIZE THE OLD UDR WITH THE NEW UDR.

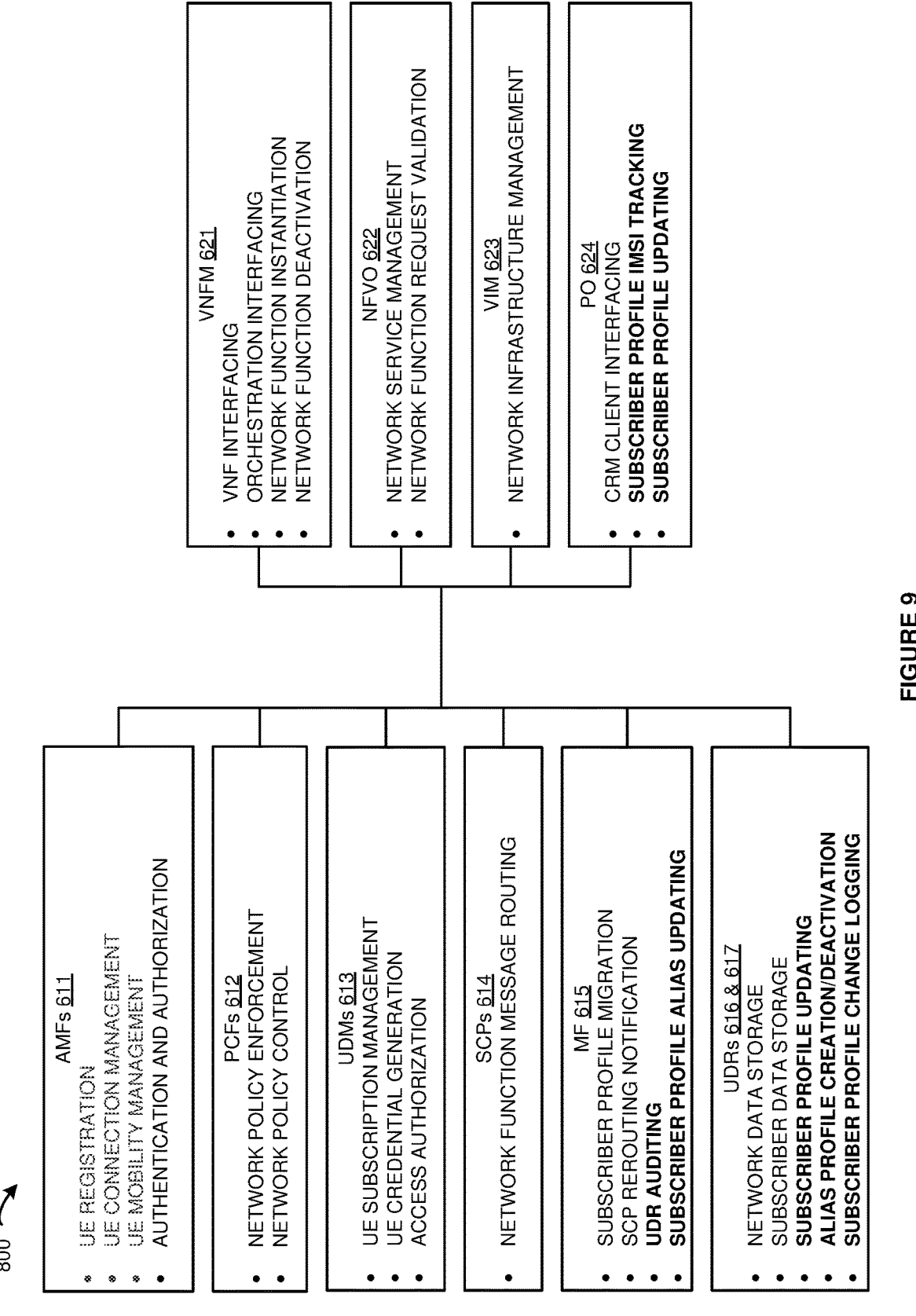

800

AMFs 611
- UE REGISTRATION
- UE CONNECTION MANAGEMENT
- UE MOBILITY MANAGEMENT
- AUTHENTICATION AND AUTHORIZATION

PCFs 612
- NETWORK POLICY ENFORCEMENT
- NETWORK POLICY CONTROL

UDMs 613
- UE SUBSCRIPTION MANAGEMENT
- UE CREDENTIAL GENERATION
- ACCESS AUTHORIZATION

SCPs 614
- NETWORK FUNCTION MESSAGE ROUTING

MF 615
- SUBSCRIBER PROFILE MIGRATION
- SCP REROUTING NOTIFICATION
- UDR AUDITING
- SUBSCRIBER PROFILE ALIAS UPDATING

UDRs 616 & 617
- NETWORK DATA STORAGE
- SUBSCRIBER DATA STORAGE
- SUBSCRIBER PROFILE UPDATING
- ALIAS PROFILE CREATION/DEACTIVATION
- SUBSCRIBER PROFILE CHANGE LOGGING

VNFM 621
- VNF INTERFACING
- ORCHESTRATION INTERFACING
- NETWORK FUNCTION INSTANTIATION
- NETWORK FUNCTION DEACTIVATION

NFVO 622
- NETWORK SERVICE MANAGEMENT
- NETWORK FUNCTION REQUEST VALIDATION

VIM 623
- NETWORK INFRASTRUCTURE MANAGEMENT

PO 624
- CRM CLIENT INTERFACING
- SUBSCRIBER PROFILE IMSI TRACKING
- SUBSCRIBER PROFILE UPDATING

FIGURE 9

UNIFIED DATA REGISTRY (UDR) SYNCHRONIZATION IN A WIRELESS COMMUNICATION NETWORK

TECHNICAL FIELD

Various embodiments of the present technology relate to network data storage, and more specifically, to synchronizing Unified Data Registries (UDRs) to support UDR fallback.

BACKGROUND

Wireless communication networks provide wireless data services to wireless user devices. Exemplary wireless data services include voice calling, video calling, internet-access, media-streaming, online gaming, social-networking, and machine-control. Exemplary wireless user devices comprise phones, computers, vehicles, robots, and sensors. Radio Access Networks (RANs) exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores over backhaul data links. The core networks execute network functions to provide wireless data services to the wireless user devices. Exemplary network functions include Access and Mobility Management Function (AMF), Policy Control Function (PCF), Unified Data Management (UDM), and Unified Data Registry (UDR).

UDR is a Fifth Generation Core (5GC) network entity that stores network and subscriber data. The subscriber data into organized into subscriber profiles that each correspond to a wireless user device subscribed for service on the network. The subscriber profiles store data like service attributes, network policy authorizations, mobility policies, and the like. The subscriber profiles are associated with the user devices based on device Identifiers (IDs) like International Mobile Subscriber Identity (IMSI). When another network function (e.g., UDM) needs to retrieve subscriber data to serve a user device, the network function accesses the subscriber profile stored by the UDR that is associated with that user device. The network function then serves the user device based on the retrieved subscriber data.

The increase in Fifth Generation (5G) subscribers in wireless communication networks stresses the storage capacity of UDR. To account for the increase in subscribers and reduce the stress on the existing UDR, the networks instantiate additional UDRs to increase the storage capacity of the network. Once instantiated, the network moves subscriber profiles stored on the original to the new UDRs in a process referred to as migration. However, newly instantiated UDRs are unstable and unreliable. This instability inhibits the new UDRs from effectively storing subscriber data and increases the difficulty of UDR profile migration. Unfortunately, wireless communication networks do not efficiently migrate subscriber profiles to new UDRs. Moreover, wireless communication networks do not effectively fallback to the original UDR when the newly instantiated UDRs are unstable.

OVERVIEW

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions for network data storage. Some embodiments comprise a method of operating a wireless communication network to synchronize Unified Data Registries (UDRs) during data migration from a first UDR to a second UDR. The method comprises receiving a provisioning data update for a subscriber profile, determining the subscriber Identity (ID) for the subscriber profile, and determining the subscriber profile has been migrated to the second UDR based on the subscriber ID. The method further comprises updating the subscriber profile stored on the second UDR based on the provisioning data update, logging the provisioning data update, and triggering a synchronization update on the first UDR. The method further comprises auditing the first UDR to identify a subscription alias for the subscriber profile stored on the first UDR and performing a delta update on the subscription alias based on the logged provisioning data update to synchronize the first UDR with the second UDR.

Some embodiments comprise a wireless communication network to synchronize UDRs during data migration from a first UDR to a second UDR. The wireless communication network comprises a provisioning orchestrator, UDR provisioning controllers, and a migration controller. The provisioning orchestrator receives a provisioning data update for a subscriber profile, determines the subscriber ID for the subscriber profile, determines the subscriber profile has been migrated to the second UDR based on the subscriber ID, and directs a second UDR provisioning controller to implement the provisioning data update. The second UDR provisioning controller receives the provisioning data update, updates the subscriber profile stored on the second UDR based on the provisioning data update, logs the provisioning data update, and triggers a synchronization update on the first UDR. The data migration controller detects the synchronization update trigger, audits the first UDR to identify a subscription alias for the subscriber profile stored on the first UDR, and directs a first UDR provisioning controller for to implement a delta update. The first UDR provisioning controller performs the delta update on the subscription alias based on the logged provisioning data update to synchronize the first UDR with the second UDR.

Some embodiments comprise one or more non-transitory computer-readable storage media having program instructions stored thereon to synchronize UDRs during data migration from a first UDR to a second UDR. When executed by a computing system, the program instructions direct the computing system to perform operations. The operations comprise receiving a provisioning data update for a subscriber profile, determining the subscriber ID for the subscriber profile, and determining the subscriber profile has been migrated to the second UDR based on the subscriber ID. The operations further comprise updating the subscriber profile stored on the second UDR based on the provisioning data update, logging the provisioning data update, and triggering a synchronization update on the first UDR. The operations further comprise auditing the first UDR to identify a subscription alias for the subscriber profile stored on the first UDR and performing a delta update on the subscription alias based on the logged provisioning data update to synchronize the first UDR with the second UDR.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 2 illustrates an exemplary operation of the communication network to synchronize the network data systems during data migration.

FIG. 4 illustrates an exemplary operation of the wireless communication network to synchronize UDRs during data migration.

FIG. 9 further illustrates the NFVI in the 5G wireless communication network.

Figure 1:
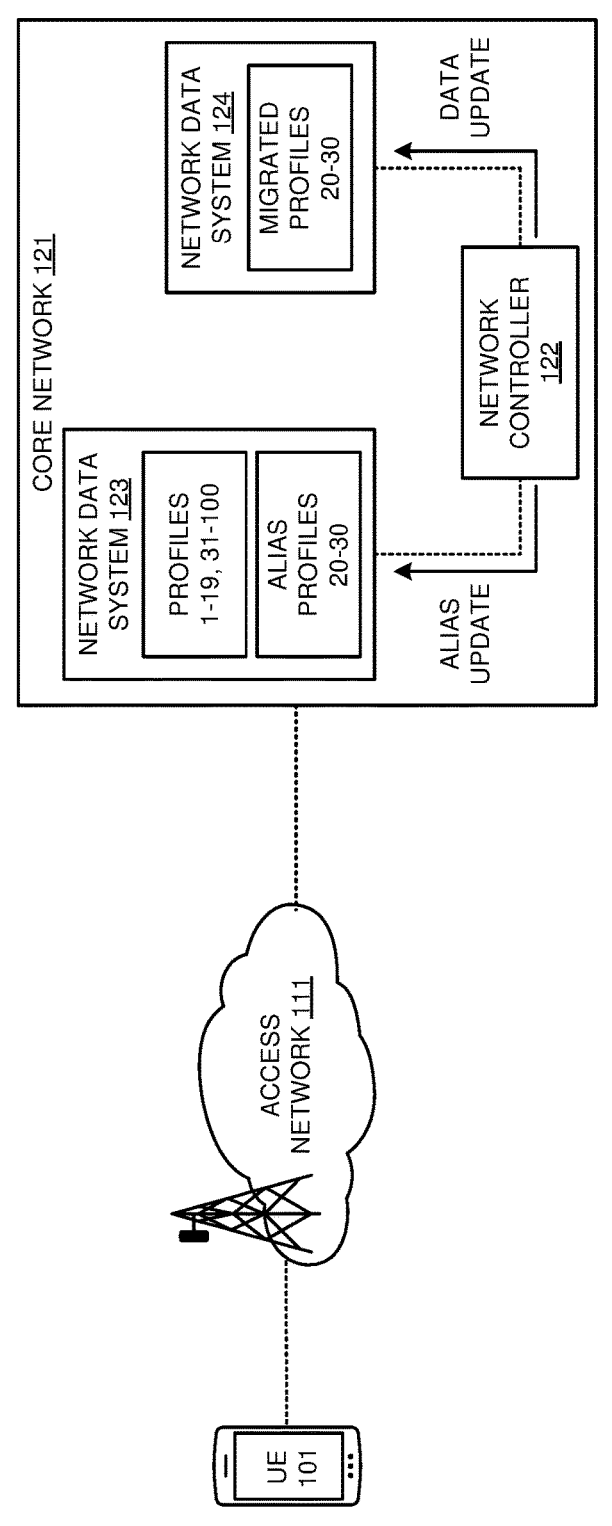
FIG. 1 illustrates a communication network to synchronize network data systems during data migration.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

TECHNICAL DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates communication network 100 to synchronize network data systems during data migration. Communication network 100 delivers services like voice calling, machine communications, internet-access, media-streaming, or some other wireless/wireline communications product to user devices. Communication network 100 comprises User Equipment (UE) 101, access network 111, and core network 121. Core network 121 comprises network controller 122, network data system 123, and network data system 124. In other examples, communication network 100 may comprise additional or different elements than those illustrated in FIG. 1.

Various examples of network operation and configuration are described herein. In some examples, data systems 123 and 124 store subscriber profiles for users on network 100. The profiles comprise service attributes that define the level of service to be provided to the users. For example, the subscriber profile for UE 101 may comprise data that indicates the Quality-of-Service (QOS), bitrate, latency, mobility policies, network policy authorization, and/or other metrics defining the level of service for UE 101. Network entities within core network 121 read the service attributes stored in the subscriber profiles to provide wireless data services to user devices (e.g., UE 101) over access network 111.

Network data system 124 is representative of a newly instantiated data system in core network 121. For example, network data system 123 may have reached its functional limit (e.g., at or near storage capacity) thereby requiring the creation of a new data system. When network data system 124 is instantiated, a portion of the subscriber profiles stored on data system 123 are migrated to data system 124. As illustrated in FIG. 1, data system 123 stores user profiles 1-19 and 31-100 and while network data system 124 stores migrated profiles 20-30. Network data system 123 also stores alias profiles 20-30. These numbers are exemplary and are typically far larger in real-world implementations. The alias profiles comprise copies of the migrated profiles allowing core network 121 to fallback to data system 123 if a problem occurs on system 124 during the migration process. For example, network controller 122 may detect instability in system 124, and in response, deactivate system 124 and direct data system 123 to convert alias profiles 20-30 back into active subscriber profiles.

Network controller 122 detects a data update for a subscriber profile. Controller 122 reads the subscriber Identifier (ID) for the profile to determine if the profile has been migrated from network data system 123 to network data system 124. Controller 122 determines the subscriber ID corresponds to one of migrated profiles 20-30. Controller 122 directs data system 124 to update the migrated profile. Data system 124 updates the profile based on the direction from controller 122 and logs the changes made to the profile. Network controller 122 identifies the alias profile stored on data system 123 that corresponds to the updated profile stored on data system 124. Network controller 122 directs data system 123 to update the alias profile based on the logged changes to the corresponding migrated profile. Data system 123 updates the profile based on the direction from controller 122. By updating both the migrated and alias profiles, network controller 122 synchronizes the newly instantiated data system (data system 124) with the original data system (data system 123).

The synchronization allows network 100 to seamlessly fallback to data system 123 in the event a problem occurs on data system 124 during the data migration thereby inhibiting service interruptions to UE 101. For example, the subscriber profile for UE 101 may comprise one of migrated profiles 20-30. If network controller 122 detects a problem with data system 124 (e.g., storage instability) requiring system 124 to be temporarily deactivated, controller 122 reroutes data requests for the migrated profiles on system 124 to system 123. Since the alias profiles are maintained up-to-date with the migrated profiles, network entities within core network 121 that serve UE 101 are able to access the subscriber data for UE 101. The real/near real-time ability to access the subscriber data for UE 101 inhibits service interruptions to UE 101 over access network 111 during situations where data system fallback is required.

UE 101 is representative of a wireless/wireline user device. Exemplary user devices include phones, smartphones, computers, vehicles, drones, robots, sensors, and/or other devices with wireless communication capabilities. Access network 111 exchanges wireless signals with user devices 101 over radio frequency bands. The radio frequency bands use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). Access network 111 is connected to core network 121 over backhaul data links. Access network 111 exchanges network signaling and user data with network elements in core network 121.

Access network 111 may comprise wireless access nodes, internet backbone providers, edge computing systems, or other types of wireless/wireline access systems to provide wireless links to user devices 101, the backhaul links to core network 121, and the edge computing services between user devices 101 and core network 121. Although access network 111 is illustrated as a tower, access network 111 may comprise another type of mounting structure (e.g., buildings), or no mounting structure at all. The wireless access nodes of access network 111 may comprise Fifth Generation (5G) RANs, LTE RANs, gNodeBs, eNodeBs, NB-IoT access nodes, LP-WAN base stations, wireless relays, WIFI hotspots, Bluetooth access nodes, and/or other types of wireless or wireline network transceivers. The access nodes may comprise Radio Units (RUs), Distributed Units (DUs) and Centralized Units (CUs). The RUs may be mounted at elevation and have antennas, modulators, signal processors, and the like. The RUs are connected to the DUs which are usually nearby network computers. The DUs handle lower wireless network layers like the Physical Layer (PHY), Media Access Control (MAC), and Radio Link Control (RLC). The DUs are connected to the CUs which are larger computer centers that are closer to core network 121. The CUs handle higher wireless network layers like the Radio Resource Control (RRC), Service Data Adaption Protocol (SDAP), and Packet Data Convergence Protocol (PDCP). The CUs are coupled to network functions in core network 121.

Core network 121 is representative of computing systems that provide wireless data services to user devices 101 over access network 111. Exemplary computing systems comprise data centers, server farms, Network Function Virtualization Infrastructure (NFVI), cloud computing networks, hybrid cloud networks, and the like. The computing systems of core network 121 store and execute the network functions to form network controller 122, data systems 123, and data system 124 to provide wireless data services to user devices 101 over access network 111. Network controller 122 may comprise network functions like provisioning orchestrators, migration controllers, and the like. Network data systems 123 may comprise network entities like Unified Data Registry (UDR) and the like. The computing systems of core network 121 typically store and execute other network functions to form a control plane (not illustrated) and a user plane (not illustrated) to serve UE 101. The control plane typically comprises network functions like Access and Mobility Management Function (AMF), Session Management Function (SMF), Policy Control Function (PCF), Unified Data Management (UDM), and Home Subscriber Server (HSS). The user plane typically comprises network functions like User Plane Function (UPF). Core network 121 may comprise a Fifth Generation Core (5GC) architecture, an Evolved Packet Core (EPC) architecture, and the like.

FIG. 2 illustrates process 200. Process 200 comprises an exemplary operation of communication network 100 to synchronize network data systems during data migration. The operation may vary in other examples. The operations of process 200 comprise detecting an update for a migrated user profile stored on a new network data system (step 201). The operations further comprise updating the migrated user profile and logging the changes to the profile (step 202). The operations further comprise identifying an alias profile that corresponds to the migrated user profile stored on the original network data system (step 203). The operations further comprise updating the alias profile based on the logged changes to synchronize the original network data system with the new network data system (step 204).

Figure 3:
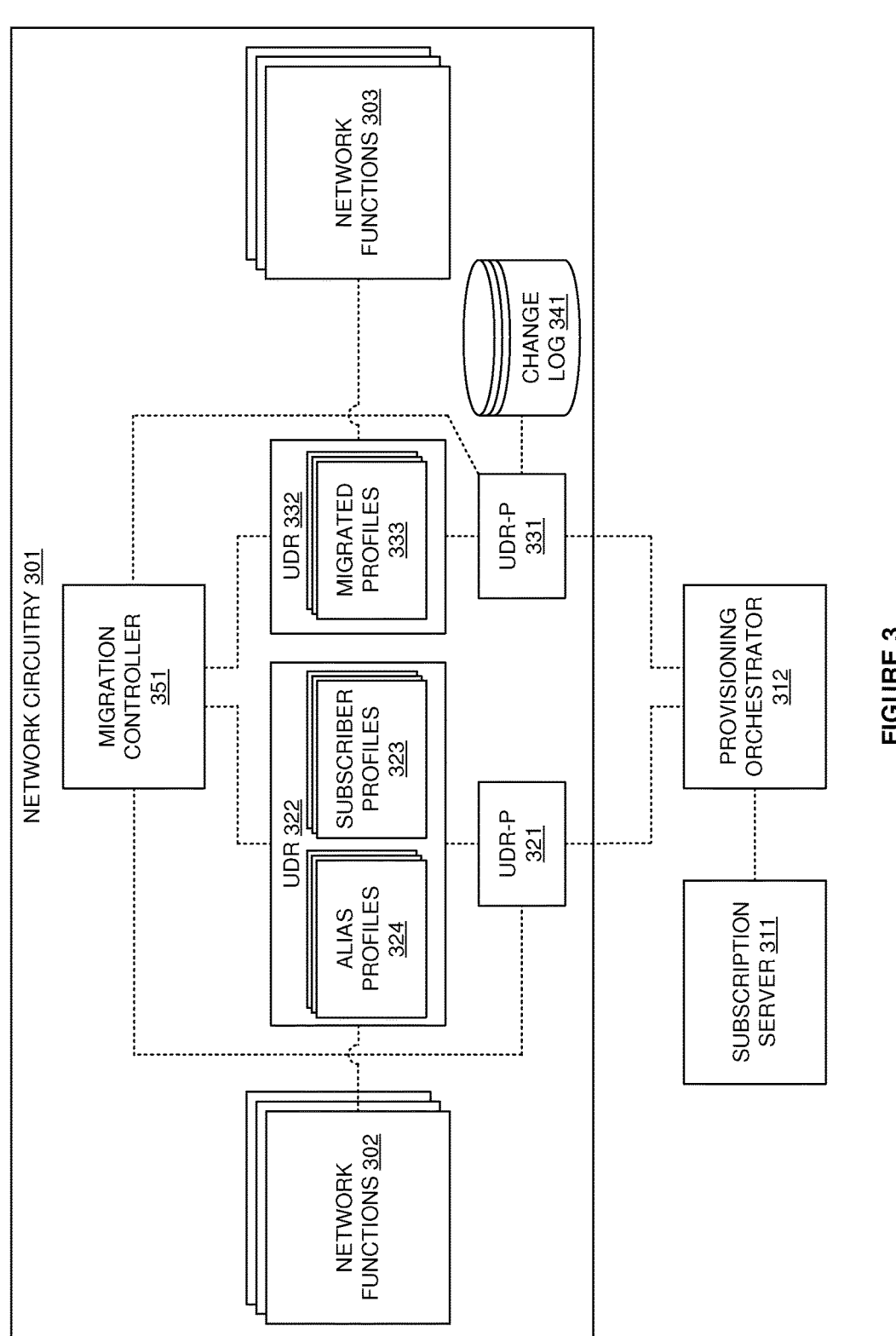
FIG. 3 illustrates a wireless communication network to synchronize Unified Data Registries (UDRs) during data migration.

FIG. 3 illustrates wireless communication network 300 to synchronize Unified Data Registries (UDRs) during data migration. Wireless communication network 300 is an example of communication network 100, however network 100 may differ. Wireless communication network 300 comprises network circuitry 301, subscription server 311, and provisioning orchestrator 312. Network circuitry 301 comprises network functions 302 and 303, UDR-Provisioners (UDR-Ps) 321 and 331, UDRs 322 and 332, change log 341, and migration controller 351. UDR 322 comprises subscriber profiles 323 and alias profiles 324. UDR 332 comprises migrated profiles 333. UDR 322 is representative of the original UDR while UDR 332 is representative of a newly instantiated UDR. Network functions 302 and 303 comprise 5GC and/or EPC network entities like AMF, PCF, UDM, HSS, Session Communication Proxy (SCP), and Diameter Routing Agent (DRA). In other examples, wireless network 300 may comprise additional or different elements than those illustrated in FIG. 3.

In some examples, provisioning orchestrator 312 receives a subscriber profile update from subscription server 311. For example, a user in network 300 may have upgraded their level of service and subscription server 311 may transfer the update to orchestrator 312 to modify the user's subscriber profile to include the upgraded service level. Orchestrator 312 determines the subscriber Identifier (ID) associated with the update and determines if the profile has been migrated to UDR 332 based on the subscriber ID. For example, orchestrator 312 may host a list that indicates a range of subscriber IDs stored on UDR 322 and another range of subscriber IDs stored on UDR 332. Alternatively, orchestrator 312 may query UDR-Ps 321 and 331 to determine if the subscriber profile for that subscriber ID is stored on UDR 322 or UDR 332. Exemplary subscriber IDs include International Mobile Subscriber Identity (IMSI), Subscriber Permanent Identifier (SUPI), and the like.

In this example, orchestrator 312 determines the subscriber ID corresponds to one of migrated profiles 333. In response, orchestrator 312 transfers the data update to UDR-P 331 and directs UDR-P 331 to modify the one of migrated profiles 333 that comprises the subscriber ID. UDP-331 locates the one of migrated profiles stored on UDR 332 based on the subscriber ID and implements the provisioning update. UDR-P 331 logs the changes to the migrated subscriber profile in change log 341 and notifies migration controller 351 of the update. The notification to migration controller 351 indicates the subscriber ID for the updated profile and the logged changes to the profile. Migration controller 351 audits UDR 322 to identify the one of alias profiles 324 that comprises the subscriber ID. Migration controller 351 forms a delta update based on the logged changes to the migrated profile. Migration controller 351 directs UDR-P 321 to perform the delta update to the alias profile. UDR-P 321 locates the one of alias profiles 324 stored on UDR 322 based on the subscriber ID and implements the delta update. The delta update modifies the one of alias profiles 324 to match the corresponding one of migrated profiles 333. UDR-P 321 notifies migration controller 351 the update was successful to confirm that UDR 322 and UDR 323 are synchronized.

Network circuitry 301, subscription server 311, and provisioning orchestrator 312 communicate over various links that use metallic links, glass fibers, radio channels, or some other communication media. The links use Fifth Generation Core (5GC), Evolved Packet Core (EPC), IEEE 802.3 (ENET), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols. Network circuitry 301, subscription server 311, and provisioning orchestrator 312 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), Field Programmable Gate Array (FPGA), and/or the like. The memories comprise Random Access Memory (RAM), flash circuitry, Solid State Drives (SSD), Non-Volatile Memory Express (NVMe) SSDs, Hard Disk Drives (HDDs), and/or the like. The memories store software like operating systems, user applications, radio applications, network functions, and multimedia functions. The microprocessors retrieve the software from the memories and execute the software to drive the operation of wireless communication network 300 as described herein.

FIG. 4 illustrates process 400. Process 400 comprises an exemplary operation of wireless communication network 300 to synchronize UDRs during data migration. Process 400 comprises an example of process 200 illustrated in FIG. 2, however process 200 may differ. The operations of process 200 comprise receiving a provisioning updated for a subscriber profile (step 401). The operations further comprise determining the subscriber ID for the subscriber profile and determine the subscriber profile has been migrated to a new UDR based on the subscriber ID (step 402). The operations further comprise updating the subscriber profile stored on the new UDR based on the providing data update (step 403). The operations further comprise logging the provisioning data update and triggering a synchronization update on the old UDR (step 404). The operations further comprise auditing the old UDR to identify a subscription alias for the subscriber profile stored on the new UDR (step 405). The operations further comprise performing a delta update on the subscription alias based on the logged provisioning data update to synchronize the old UDR with the new UDR (step 406).

Figure 5:
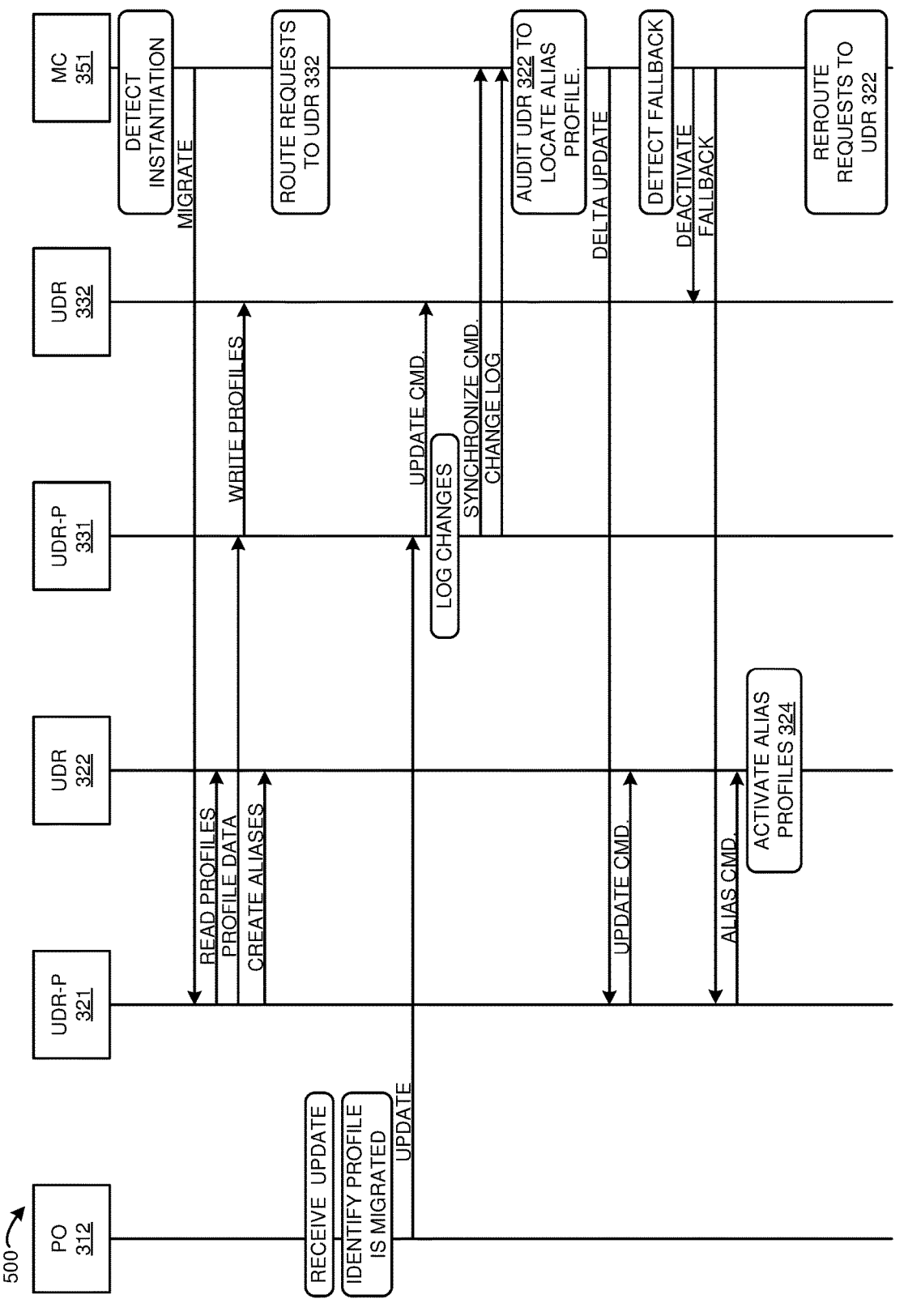
FIG. 5 illustrates another exemplary operation of the wireless communication network to synchronize UDRs during data migration.

FIG. 5 illustrates process 500. Process 500 comprises an exemplary operation of wireless communication network 300 to synchronize UDRs during data migration. Process 500 comprises an example of process 200 illustrated in FIG.

2 and process 400 illustrated in FIG. 4, however processes 200 and 400 may differ. In some examples, network operators instantiate UDR 332 to increase the storage capacity of network 300. Migration controller (MC) 351 receives a migration command from network operators that directs controller 351 to move subscriber profiles within a specified IMSI range from UDR 322 to the newly instantiated UDR 332. Migration controller 351 directs UDR-P 321 to migrate ones of subscriber profiles 323 to UDR 332 that fall within the specified IMSI range. UDR-P 321 reads the subscription data from the specified profiles and transfers the profile data to UDR-P 331. UDR-P 331 writes the subscription data to UDR 332 to form migrated profiles 333. UDR-P 321 directs UDR 322 to create aliases for the migrated profiles. In response, UDR 322 converts the migrated ones of subscriber profiles 323 into alias profiles 324. Migration controller 351 interfaces with network functions 302 and 303 to route data requests for migrated profiles 333 to UDR 332.

Once the subscriber profiles have been migrated to UDR 332, provisioning orchestrator 312 receives a provisioning data update from subscription server 311. The provisioning data update comprises new service attributes, mobility policies, and the like for one of the migrated subscriber profiles stored on UDR 332. The provisioning update identifies the migrated profile by IMSI. Provisioning orchestrator 312 maintains an IMSI list that indicates which profiles are stored on UDR 322 and which profiles are stored on UDR 332. Provisioning orchestrator 312 compares the IMSI specified by the provisioning update to the IMSI list to determine the storage location for the profile. Orchestrator 312 directs UDR-P 331 to update the one of migrated profiles 333 that corresponds to the IMSI and transfers the provisioning update to UDR-P 331. UDR-P 331 transfers an update command (CMD.) to UDR 332 to implement the update. UDR 332 modifies the service attributes in the one of migrated profiles 333 that comprises the specified IMSI and acknowledges the update to UDR-P 331. UDR-P 331 logs the changes made to the subscriber profile and notifies provisioning orchestrator 312 of the successful update.

In response to the successful update, UDR-P 331 triggers a UDR synchronization process. UDR-P 331 transfers a synchronization command to migration controller 351. The synchronization command indicates the IMSI of the updated profile as well as the logged changes to the updated profile. Migration controller 351 receives the update and audits UDR 322 to locate the one of alias profiles 324 that corresponds to the updated one of migrated profiles 333. Migration controller 351 generates a delta update based on the logged changes and directs UDR-P 321 to implement the delta update on the alias profile. UDR-P 321 transfers an update command to UDR 322 to implement the delta update. UDR 322 modifies the service attributes in the one of alias profiles 333 and acknowledges the update to UDR-P 321. UDR-P 321 acknowledges the successful delta update to migration controller 351 to confirm the synchronization between UDRs 322 and 332.

Migration controller 351 detects a fallback condition for UDR 332. For example, network operators monitoring UDR 332 may determine UDR 332 is unstable and direct controller 351 to perform a UDR fallback. Migration controller 351 transfers a deactivation command to UDR 332 and transfers a fallback command to UDR-P 321. The deactivation command directs UDR 332 to deactivate for a specified period of time to allow network operators to alleviate the fallback condition. The fallback command directs UDR-P 321 to convert alias profiles 334 back into active subscriber profiles. UDR-P 321 receives the fallback command and responsively directs UDR 322 to convert alias profiles 324. UDR 322 converts alias profiles 324 into active subscriber profiles and acknowledges the conversion to UDR-P 321. UDR-P 321 notifies migration controller 351 of the successful activation. In response, migration controller 351 reroutes data requests from network functions 303 for subscriber data in migrated profiles 333 to UDR 322.

Advantageously, wireless communication network 300 efficiently migrates subscriber profiles to new UDRs by synchronizing the data stored on the original UDR with the new UDR. Moreover, wireless communication network 300 effectively enables UDR fallback may maintaining synchronization between the old and new UDRs.

Figure 6:
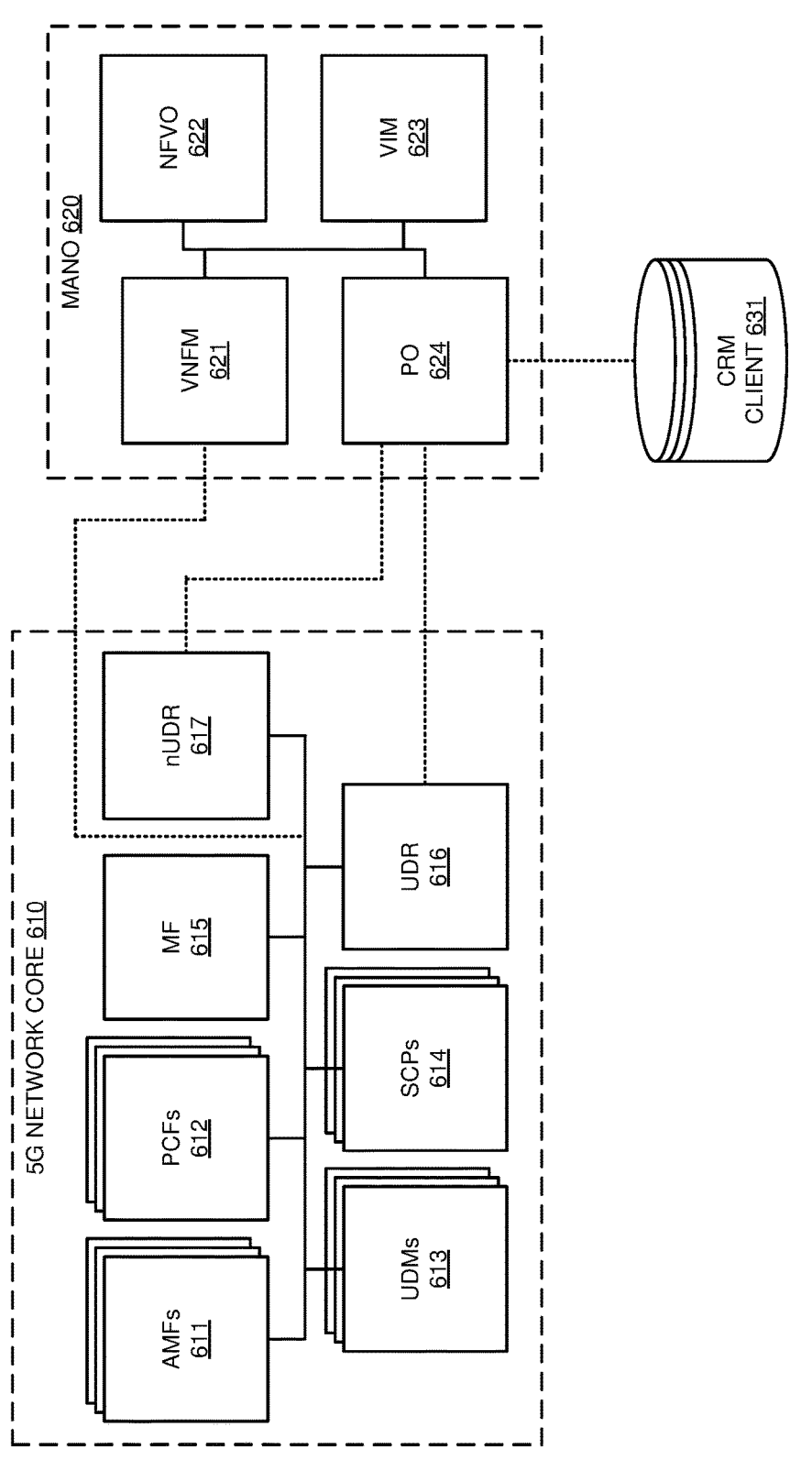
FIG. 6 illustrates a Fifth Generation (5G) wireless communication network to synchronize UDRs during data migration.

FIG. 6 illustrates 5G communication network 600 to synchronize UDRs during data migration. 5G communication network 600 comprises an example of communication network 100 illustrated in FIG. 1 and wireless communication network 300 illustrated in FIG. 3, however networks 100 and 300 may differ. 5G communication network 600 comprises network core 610, Management and Orchestration (MANO) 620, and CRM client 631. 5G network core 610 comprises Access and Mobility Management Function (AMFs) 611, Policy Control Function (PCFs) 612, Unified Data Managements (UDMs) 613, Session Communication Proxies (SCPs) 614, Migration Function (MF) 615, UDR 616, and new-UDR (nUDR) 617. MANO 620 comprises Virtual Network Function Manager (VNFM) 621, Network Function Virtualization Orchestrator (NFVO) 622, Virtualized Infrastructure Manager (VIM) 623, and Provisioning Orchestrator (PO) 624. Other network functions and network entities like Session Management Function (SMF), User Plane Function (UPF), Authentication Server Function (AUSF), Network Slice Selection Function (NSSF), Network Repository Function (NRF), Equipment Identity Register (EIR), Network Exposure Function (NEF), and Application Function (AF) are typically present in 5G network core 610 and/or MANO 620 but are omitted for clarity. In other examples, 5G communication network 600 may comprise different or additional elements than those illustrated in FIG. 6.

In some examples, network operators determine UDR 616 is at its functional limits and decide to instantiate nUDR 617. For example, the growth of subscribers in network 600 may cause the memory resources allocated to UDR 616 to become exhausted. NFVO 622 receives an instantiation command from the network operators to create nUDR 617. NFVO 622 interfaces with VIM 623 to reserve the hardware resources in network core 610 to create nUDR 617. VIM 623 reserves the hardware resources for nUDR 617 and notifies NFVO 622. In response, NFVO 622 directs VNFM 621 to instantiate nUDR 617 using the hardware resource reserved by VIM 623. VNFM 621 transfers an instantiation command to network core 610 to instantiate nUDR 617. Network core 610 forms nUDR 617 using the hardware resources allocated by VIM 623. NFVO 622 generates a migration command that specifies an IMSI range and directs MF 615 to migrate subscriber profiles within the IMSI range from UDR 616 to nUDR 617. The IMSI range may be selected by network operators or may be a preconfigured setting. NFVO 622 transfers the migration command to MF 615 over VNFM 621. NFVO 622 also notifies PO 624 of the migrated IMSI range.

MF 615 receives the migration command and audits UDR 616 to identify subscriber profiles that comprise IMSIs that fall within the IMSI range specified by the migration command. MF 615 copies the identified profiles and writes the copied data to nUDR 617 to migrate the subscriber profiles.

MF 615 directs UDR 616 to convert the migrated profiles into alias profiles to back-up the migrated subscriber data. For example, the migration command may direct MF 615 to migrate subscriber profiles within the IMSI range 800-900. MF 615 may audit UDR 616 to identify subscriber profiles within this range and copy the profiles to nUDR 617. UDR 616 may then convert the profiles within the IMSI range 800-900 into alias profiles. In some examples, the alias profiles comprise deactivated subscriber profiles that maintain a replica of the subscriber data migrated to nUDR 617. MF 615 directs SCPs 614 to route subscription data requests for the data stored in the migrated profiles from UDR 616 to nUDR 617. SCPs 614 receive subscription data requests from AMFs 621, PCFs 622, and UDMs 623 for migrated subscriber data and routes requests to nUDR 617. nUDR 617 returns the requested data to SCPs 614 which routes the data to AMFs 621, PCFs 622, and UDMs 623.

During the data migration, PO 624 receives a provisioning data update from CRM client 631. The provisioning update specifies a subscriber profile by IMSI and comprises an update to the subscriber data for that profile. The update may modify provisioned service attributes, authorized network policies, mobility data, and the like. CRM client 631 is representative of a computing system that handles new profile activation and user subscription changes. For example, a user may modify their subscription to include guaranteed bitrate services. CRM client 631 may be notified or otherwise detect this update and transfer the provisioning data update to PO 624. In some examples, the provisioning data update may direct PO 624 to create a new subscriber profile on nUDR 617.

In this example, the provisioning update is for a profile migrated to nUDR 617. PO 624 compares the IMSI specified by the provisioning update to the migrated IMSI range indicated by NFVO 622 to determine the profile is located on nUDR 617. Alternatively, PO 624 may not have access to the migrated IMSI range and instead ping UDRs 616 and 617 to locate the subscriber profile. For example, PO 624 may transfer information requests to UDR 616 and nUDR 617 to determine if the profile with the IMSI indicated in the provisioning update is stored on the respective UDRs. UDR 616 may transfer a response indicating that profile is not stored on UDR 616 while nUDR 617 may transfer a response indicating that profile is stored on nUDR 617.

Once the profile is located, PO 624 transfers the provisioning data update to nUDR 617. nUDR 617 identifies the profile based on the IMSI and modifies the subscription data in the profile based on the update. nUDR 617 may modify the provisioned service attributes, authorized network policies, mobility data, and/or other subscriber data based on the data update. nUDR 617 logs the changes made to the subscriber profile and triggers a UDR synchronization towards MF 615. MF 615 detects the synchronization trigger and audits UDR 616 to locate the alias profile that corresponds to the updated profile stored in nUDR 617. MF 615 generates a delta update based on the logged changes and transfers the delta update to UDR 616. UDR 616 identifies the alias profile based on the IMSI and modifies the subscription data in the alias profile based on the delta update. The update to the alias profile synchronizes UDR 616 with nUDR 617 to allow for UDR fallback.

Subsequently, nUDR 617 is determined to be unstable. For example, network operators monitoring the progress of the data migration may determine nUDR 617 is unstable. Alternatively, network functions in core 610 (e.g., MF 615) or entities in MANO 620 (e.g., NFVO 622) may determine that nUDR 617 is unstable. Typically, UDR instability comprises any software or hardware fault that degrades the data storage ability of nUDR 617. For example, there may be a software version mismatch in nUDR 617 inhibiting nUDR 617 from effectively committing subscriber data to memory.

When nUDR 617 is identified as unstable, NFVO 622 notifies VNFM 621 that UDR fallback is required. VNFM 621 directs MF 615 to fallback to UDR 616 and directs nUDR 617 to deactivate. In response to the direction from VNFM 621, nUDR 617 deactivates and MF 615 directs UDR 616 to convert the alias profiles into active subscriber profiles. UDR 616 converts the aliases into active profiles and notifies MF 615. MF 615 directs SCPs 614 to reroute subscription data requests for the migrated profiles from nUDR 617 back to UDR 616. SCPs 614 receive subscription data requests from AMFs 621, PCFs 622, and UDMs 623 for migrated subscriber data and routes requests to UDR 616. UDR 616 returns the requested data to SCPs 614 which routes the data to AMFs 621, PCFs 622, and UDMs 623. Since the alias profiles stored on UDR 616 are maintained up-to-date with the migrated profiles stored on nUDR 617, network 600 is able to effectively and efficiently fallback to UDR 616. The UDR synchronization obviates the need to perform an update across UDR 616 (e.g., if the alias profiles did not match the migrated profiles) thereby reducing the time required to perform the UDR fallback. The reduced time requirement reduces the risk of service interruptions to subscribers (e.g., force deregistration) on network 600 during UDR fallback.

Figure 7:
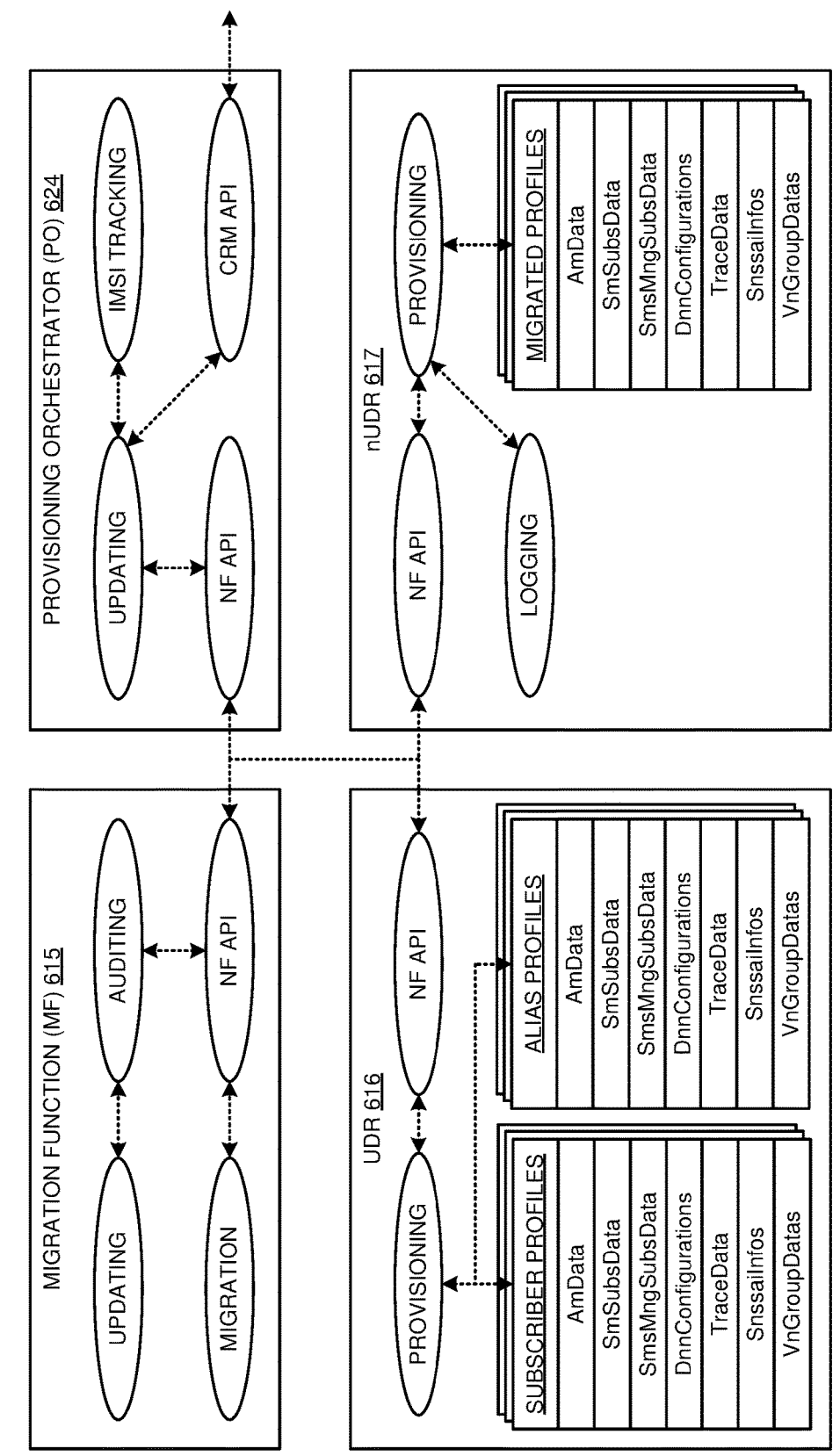
FIG. 7 illustrates network functions in the 5G wireless communication network.

FIG. 7 illustrates MF 615, UDR 616, nUDR 617, and PO 624 in 5G wireless communication network 600. MF 615 comprises modules for UDR auditing, subscriber profile updating, subscriber profile migration, and network function (NF) Application Programming Interface (API). The subscriber profile migration module migrates profiles from an original UDR (e.g., UDR 616) to a newly instantiated UDR (e.g., nUDR 617) based on IMSI range. The migration module reads the subscription data in profiles that fall within the IMSI range stored on UDR 616 and writes the data to nUDR 617 to form the migrated subscriber profiles. The migration module directs the provisioning module in UDR 616 to convert the migrated subscriber profiles into alias profiles. The UDR auditing module audits UDR 616 to identify alias profiles that correspond to migrated profiles on nUDR 617 in response to synchronization triggers received from the provisioning module in nUDR 617. The subscriber profile updating module generates delta updates for the alias profiles based on logged changes to the migrated profiles. The updating module transfers the delta updates to the provisioning module in UDR 616 to update the alias profiles and maintain the synchronization between UDRs 616 and 617.

UDR 616 comprises modules for provisioning control and network function API and stores subscriber profiles and alias profiles. The provisioning control module converts active subscriber profiles into alias profiles in response to direction from the migration module in MF 615 and implements delta updates on the alias profiles in response to direction from the updating module in MF 615. The subscriber profile comprises service attributes like access and mobility data (AmData), session management subscription data (SmSubsData), SMS management subscription data (SmsMngSubsData), DNN configurations (DnnConfigurations), Trace Data (TraceData), S-NSSAI information (SnssaiInfos), and virtual network group data (VnGroupDatas). Each subscriber profile corresponds to an IMSI of a user device. The service attributes define the level of service for user device and often differ from profile to profile. It should be appreciated that these service attributes are exemplary and may differ in other examples. The alias profiles also comprise the service attributes and correspond to the migrated profiles stored on nUDR 617. The alias profiles represent inactive clones of the migrated subscriber profiles to maintain subscription data synchronization between UDRs 616 and 617. For example, one of the alias profiles stored on UDR 616 and the corresponding migrated subscriber stored on nUDR 617 would store the same service attributes.

nUDR 617 comprises modules for provisioning control, change logging, and network function API and stores migrated subscriber profiles. The provisioning control module in nUDR 617 implements updates to migrated subscriber profiles and creates new subscriber profiles based on direction from PO 624. The change logging module tracks changes made to the migrated subscriber profile. The provisioning control module notifies MF 615 to trigger UDR synchronization and pushes the logged changes towards MF 615. The migrated subscriber profiles comprise service attributes like AmData, SmSubsData, SmsMngSubsData, DnnConfigurations, TraceData, SnssaiInfos, and VnGroupDatas. Corresponding ones of the migrated subscriber profiles stored by nUDR 617, and the alias profiles stored by UDR 616 are both associated with the same IMSI.

PO 624 comprises modules for subscriber profile updating, IMSI tracking, network function API, and CRM client API. The subscriber profile updating module processes updates received from CRM client 631. The updates may modify subscriber profiles on UDRs 616 and 617 or create new subscriber profiles on UDRs 616 and 617. The IMSI tracking module tracks the distribution of subscriber profiles between UDR 616 and UDR 617. For example, the IMSI tracking module may identify a first IMSI range that corresponds to UDR 616 and a second IMSI range that corresponds to nUDR 617. The updating module in PO 624 interfaces with the IMSI tracking module to determine where to push updates received from CRM client 631. The interfacing modules allow MF 615, UDRs 616 and 617, and PO 624 to exchange signaling with each other, the other network functions/entities in 5G core 610 and MANO 620, and external systems like CRM client 631.

Figure 8:
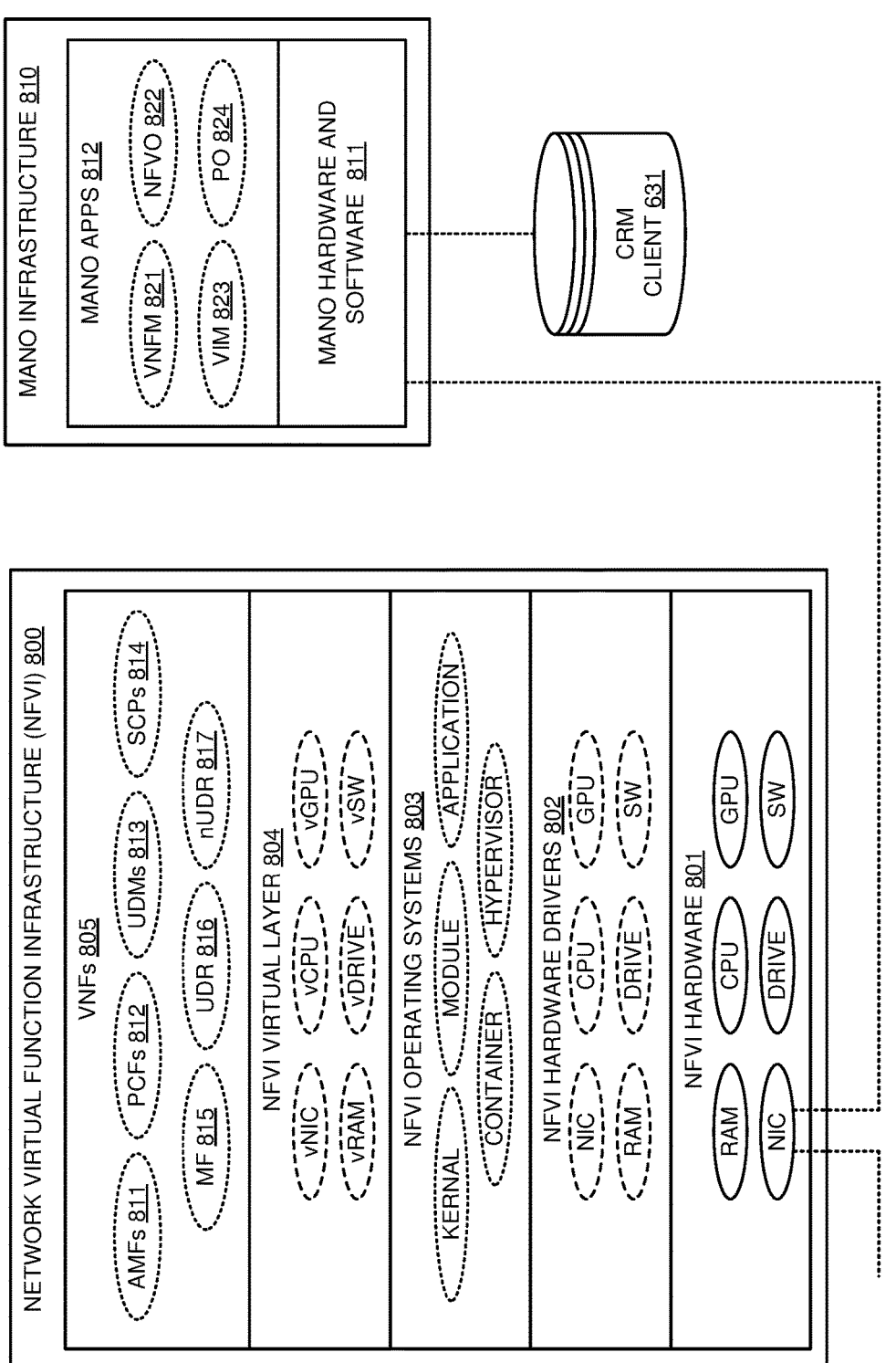
FIG. 8 illustrates a Network Function Virtualization Infrastructure (NFVI) and Management and Orchestration (MANO) in the 5G wireless communication network.

FIG. 8 illustrates Network Function Virtualization Infrastructure (NFVI) 800 and MANO infrastructure 810 in 5G wireless communication network 600. NFVI 800 comprises an example of core network 121 illustrated in FIG. 1 and network circuitry 301 illustrated in FIG. 3, although core network 121 and network circuitry 301 may differ. MANO infrastructure 810 comprises an example of provisioning orchestrator 312 illustrated in FIG. 3, however orchestrator 312 may differ. NFVI 800 comprises NFVI hardware 801, NFVI hardware drivers 802, NFVI operating systems 803, NFVI virtual layer 804, and NFVI Virtual Network Functions (VNFs) 805. NFVI hardware 801 comprises Network Interface Cards (NICs), CPU, GPU, RAM, Flash/Disk Drives (DRIVE), and Data Switches (SW). NFVI hardware drivers 802 comprise software that is resident in the NIC, CPU, GPU, RAM, DRIVE, and SW. NFVI operating systems 803 comprise kernels, modules, applications, containers, hypervisors, and the like. NFVI virtual layer 804 comprises vNIC, vCPU, vGPU, vRAM, vDRIVE, and vSW. NFVI VNFs 805 comprise AMFs 811, PCFs 812, UDMs 813, SCPs 814, MF 815, UDR 816, and nUDR 817. Additional VNFs and network elements like SMF, UPF, AUSF, NSSF, NRF, EIR, NEF, and AF are typically present but are omitted for clarity.

MANO infrastructure 810 comprises MANO hardware and software 811 and MANO applications (APPS) 812. MANO hardware and software 811 comprises MANO hardware, MANO hardware drivers, MANO operating systems, and a MANO virtual layer. The MANO hardware comprises NICs, CPU, RAM, flash/disk drives, and data switches. The MANO hardware drivers comprise software that is resident in the NIC, CPU, RAM, flash/disk drives, and data switches. The MANO operating systems comprise kernels, modules, applications, containers, hypervisors, and the like. The MANO virtual layer comprises vNIC, vCPU, vRAM, virtual flash/disk drives, and virtual data switches. MANO applications 812 comprise VNFM 821, NFVO 822, VIM 823, and PO 824. Other MANO applications are typically present but are omitted for clarity.

NFVI 800 and MANO infrastructure 810 may be located at a single site or be distributed across multiple geographic locations. The NIC in NFVI hardware 801 is coupled to a NIC in MANO hardware and software 811 and to external systems (e.g., RANs). The NIC in MANO hardware and software is coupled to the NIC in NFVI hardware 801 and to CRM client 631. NFVI hardware 801 executes NFVI hardware drivers 802, NFVI operating systems 803, NFVI virtual layer 804, and NFVI VNFs 805 to form AMFs 611, PCFs 612, UDMs 613, SCPs 614, MF 615, UDR 616, and nUDR 617. The MANO hardware in MANO hardware and software 811 executes the MANO hardware drivers, MANO operating systems, MANO virtual layer, and MANO applications 812 to form VNFM 621, NFVO 622, VIM 623, and PO 624.

FIG. 9 further illustrates NFVI 800 and MANO infrastructure 810 in 5G communication network 600. AMFs 611 comprise capabilities for UE access registration, UE connection management, UE mobility management, UE authentication, and UE authorization. PCFs 612 comprise capabilities for network policy enforcement and network policy control. UDMs 613 comprise capabilities for UE subscription management, UE credential generation, and UE access authorization. SCPs 614 comprise capabilities for network function message routing. MF 615 comprises capabilities for subscriber profile migration, SCP rerouting notification, UDR auditing, and subscriber profile alias updating. UDRs 616 and 617 comprise capabilities for network data storage, subscriber data storage, subscriber profile updating, alias profile creation and deactivation, and subscriber profile change logging. VNFM 621 comprises capabilities for virtual network function (VNF) interfacing, orchestration interfacing, network function instantiation, and network function deactivation. NFVO 622 comprises capabilities for network service management and network function request validation. VIM 623 comprises capabilities for network infrastructure management. PO 624 comprises capabilities for CRM client interfacing, subscriber profile IMSI tracking, and subscriber profile updating.

In some examples, NFVO 622 receives an instruction from network operators to instantiate nUDR 617 and to migrate subscriber profiles within an IMSI range from UDR 616 to nUDR 617. NFVO 622 interfaces with VIM 623 to reserve the hardware resources in network core 610 for nUDR 617 and interfaces with VNFM 621 to organize the software resources to instantiate nUDR 617. Network core 610 forms nUDR 617 using the hardware resources allocated by VIM 623 and the software resources selected by VNFM 621. NFVO 622 notifies MF 615 of the instantiation and directs MF 615 to migrate profiles within the IMSI range. NFVO 622 notifies PO 624 of the instantiation and the IMSI range allocated to nUDR 617.

MF 615 reads subscription data from subscriber profiles within the IMSI range stored on UDR 616 and writes the subscription data to nUDR 617 to migrate the subscriber profiles. MF 615 directs UDR 616 to convert the migrated subscriber profiles into aliases. For each migrated profile, UDR 616 generates an alias profile that stores a copy of the subscription data for a corresponding migrated profile. MF 615 directs SCPs 614 to route subscription data requests for the migrated profiles from UDR 616 to nUDR 617. SCPs 614 updates its routing policies to forward subscription data requests received from AMFs 621, PCFs 622, and UDMs 623 for migrated subscriber data from UDR 616 to nUDR 617. The migration process may be continuous and cease when the desired amount of subscriber profiles (e.g., 50%) have been migrated to nUDR 617.

During the data migration, PO 624 receives provisioning data updates from CRM client 631. The provisioning updates identify a set of subscriber profile by IMSI and comprises an update to the subscriber data for the profiles. PO 624 determines the update is for migrated subscriber profiles stored on nUDR 617 based on the IMSI ranges indicated by NFVO 622. PO 624 forwards the provisioning data updates to nUDR 617. nUDR 617 implements the update to the specified subscriber profiles and logs the changes made to the subscriber profiles. nUDR 617 transfers a synchronization required message to MF 615 that comprises the logged changes to trigger UDR synchronization. In response to the synchronization requirement MF 615 audits UDR 616 to locate the alias profiles that corresponds to the updated profiles stored in nUDR 617. MF 615 generates delta updates for the alias profiles and transfers the delta updates to UDR 616. UDR 616 modifies the subscription data in the alias profiles based on the delta update to synchronize with nUDR 617.

MF 615 monitors the progress of the subscription profile migration between UDR 616 and nUDR 617. MF 615 compares the proportion of profiles migrated to nUDR 617 to a stability threshold. The stability threshold may comprise an operator configured proportion that indicates when nUDR 617 is stable. For example, the threshold may comprise a value of 50% and when MF 615 detects that more than 50% of the profiles stored on UDR 616 have been migrated to nUDR 617, MF 615 determines nUDR 617 is stable. When MF 615 determines the proportion of profiles migrated to nUDR 617 exceeds the proportion threshold, MF 615 directs UDR 616 to clear the alias profiles stored on UDR 616. UDR 616 receives the direction and stops storing the alias profiles that correspond to the profiles migrated to nUDR 617. MF 615 notifies VNFM 621 that migration is complete. In response, VNFM 621 spins down MF 615.

Figure 10:
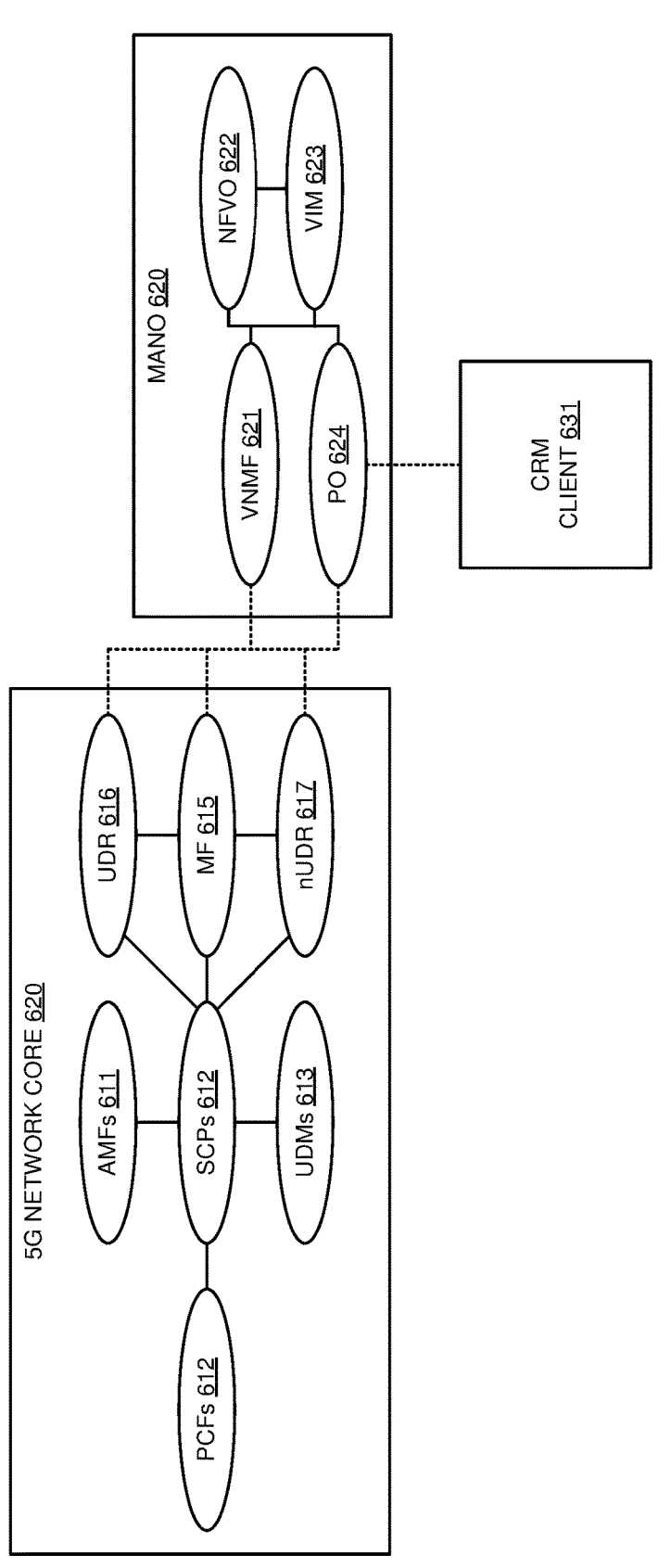
FIG. 10 illustrates an exemplary operation of the 5G wireless communication network to synchronize UDRs during data migration.

FIG. 10 illustrates an exemplary operation of 5G communication network 600 to synchronize UDRs during data migration. The operation may vary in other examples. In some examples, PO 624 receives a provisioning data update from CRM client 631 to create a subscriber new profile. PO 624 identifies the IMSI for the new subscriber profile and determines the IMSI falls within the IMSI range allocated to nUDR 617. PO 624 directs nUDR 617 to create the new subscriber profile based on the provisioning data update. nUDR 617 creates the new subscriber profile using the subscriber data included in the update and logs the creation of the new profile. nUDR 617 transfers a UDR synchronization required message to MF 615 that includes the logged changes to nUDR 617. MF 615 receives the message and identifies profile creation is required. MF 615 directs UDR 616 to create an alias profile for the new profile stored on nUDR 617 based on the logged changes. UDR 616 generates an alias profile based on the logged changes and associates the alias profile with the IMSI of the new profile.

Network operators monitoring nUDR 617 determine that nUDR 617 is unstable and direct VNFM 621 to perform UDR fallback. VNFM 621 directs MF 615 to fallback to UDR 616 and directs nUDR 617 to temporarily spin-down and indicates a time-to-weight before reactivating. nUDR 617 spins down in response to the direction and sets a timer before spinning back up. MF 615 directs UDR 616 to convert the alias profiles into active subscriber profiles and directs SCPs 614 to reroute subscription data requests for nUDR 617 to UDR 616. UDR 616 converts the alias profiles into active subscriber profiles that correspond to the profiles stored by nUDR 617 and notifies MF 615 that fallback is complete. SCPs 614 update their forwarding graphs to route data requests to nUDR 617 to UDR 616. SCPs 614 receive subscription data requests from AMFs 621, PCFs 622, and UDMs 623 and routes requests to UDR 616. UDR 616 returns the requested data to SCPs 614 which routes the data to AMFs 621, PCFs 622, and UDMs 623.

The wireless data network circuitry described above comprises computer hardware and software that form special-purpose network circuitry to synchronize UDRs during data migration. The computer hardware comprises processing circuitry like CPUs, DSPs, GPUS, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to synchronize UDRs during data migration.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention.

Thus, the invention is not limited to the specific embodiments described above, but only by the following claims and their equivalents.

What is claimed is:

1. A method of operating a wireless communication network to synchronize Unified Data Registries (UDRs) during data migration from a first UDR to a second UDR, the method comprising:

receiving a provisioning data update for a subscriber profile, determining the subscriber Identity (ID) for the subscriber profile, and determining the subscriber profile has been migrated to the second UDR based on the subscriber ID;

updating the subscriber profile stored on the second UDR based on the provisioning data update, logging the provisioning data update, and triggering a synchronization update on the first UDR;

auditing the first UDR to identify a subscription alias for the subscriber profile stored on the first UDR and performing a delta update on the subscription alias based on the logged provisioning data update to synchronize the first UDR with the second UDR.

2. The method of claim 1 further comprising:

instantiating the second UDR;

selecting a range of subscriber IDs to migrate and transferring subscriber profiles that comprise subscriber IDs within the range from the first UDR to the second UDR;

generating subscriber aliases that correspond to the transferred subscriber profiles and storing the subscriber aliases on the first UDR; and rerouting requests for data in the transferred subscriber profiles from the first UDR to the second UDR.

3. The method of claim 2 further comprising:

determining when an amount of the transferred subscriber exceed a migration threshold;

when the amount of the transferred subscriber profiles exceed the migration threshold, classifying the second UDR as stable and deleting the subscriber aliases stored on the first UDR; and wherein:

the migration threshold comprises a proportion of a total amount of the subscriber profiles stored by the first UDR.

4. The method of claim 2 further comprising:

detecting that the second UDR is unstable;

in response, triggering a UDR fallback by converting the subscriber aliases stored on the UDR into active subscriber profiles that correspond to the transferring subscriber profiles; and rerouting additional requests for the data in the transferred subscriber profiles from the second UDR to the first UDR.

5. The method of claim 1 wherein performing the delta update on the subscription alias based on the logged provisioning data update comprises modifying the subscriber alias to match the subscriber profile.

6. The method of claim 1 wherein receiving the provisioning data update for the subscriber profile comprises receiving the provisioning data update for the subscriber profile from a Customer Relationship Management (CRM) client server.

7. The method of claim 1 wherein the subscriber ID comprises an International Mobile Subscriber Identity (IMSI).

8. A wireless communication network to synchronize Unified Data Registries (UDRs) during data migration from a first UDR to a second UDR, the wireless communication network comprising:

a provisioning orchestrator configured to receive a provisioning data update for a subscriber profile, determine the subscriber Identity (ID) for the subscriber profile, determine the subscriber profile has been migrated to the second UDR based on the subscriber ID, and direct a second UDR provisioning controller to implement the provisioning data update;

the second UDR provisioning controller configured to receive the provisioning data update, update the subscriber profile stored on the second UDR based on the provisioning data update, log the provisioning data update, and trigger a synchronization update on the first UDR;

a data migration controller configured to detect the synchronization update trigger, audit the first UDR to identify a subscription alias for the subscriber profile stored on the first UDR, and direct a first UDR provisioning controller to implement a delta update;

the first UDR provisioning controller configured to perform the delta update on the subscription alias based on the logged provisioning data update to synchronize the first UDR with the second UDR.

9. The wireless communication network of claim 8 further comprising:

a Management and Orchestration (MANO) system configured to instantiate the second UDR and select a range of subscriber IDs to migrate;

the data migration controller configured to transfer subscriber profiles that comprise subscriber IDs within the range from the first UDR to the second UDR;

the first UDR provisioning controller configured to generate subscriber aliases that correspond to the transferred subscriber profiles and store the subscriber aliases on the first UDR; and the data migration controller configured to direct a Session Communication Proxy (SCP) to reroute requests for data in the transferred subscriber profiles from the first UDR to the second UDR.

10. The wireless communication network of claim 9 further comprising:

the data migration controller configured to determine when an amount of the transferred subscriber exceed a migration threshold;

when the amount of the transferred subscriber profiles exceeds the migration threshold, the data migration controller configured to classify the second UDR as stable; and the first UDR provisioning controller configured to delete the subscriber aliases stored on the first UDR; and wherein:

the migration threshold comprises a proportion of a total amount of the subscriber profiles stored by the first UDR.

11. The wireless communication network of claim 9 further comprising:

the migration controller configured to detect that the second UDR is unstable;

in response, the data migration controller configured to trigger a UDR fallback;

the first UDR provisioning controller configured to convert the subscriber aliases stored on the UDR into active subscriber profiles that correspond to the transferring subscriber profiles; and the data migration controller configured to direct the SCP reroute additional requests for the data in the transferred subscriber profiles from the second UDR to the first UDR.

12. The wireless communication network of claim 8 wherein the first UDR provisioning controller is configured to modify the subscriber alias to match the subscriber profile to perform the delta update on the subscription alias based on the logged provisioning data update.

13. The wireless communication network of claim 8 wherein the provisioning orchestrator is configured to receive the provisioning data update for the subscriber profile from a Customer Relationship Management (CRM) client server.

14. The wireless communication network of claim 8 wherein the subscriber ID comprises an International Mobile Subscriber Identity (IMSI).

15. One or more non-transitory computer-readable storage media having program instructions stored thereon to synchronize Unified Data Registries (UDRs) during data migration from a first UDR to a second UDR, wherein the program instructions, when executed by a computing system, direct the computing system to perform operations, the operations comprising:

receiving a provisioning data update for a subscriber profile, determining the subscriber Identity (ID) for the subscriber profile, and determining the subscriber profile has been migrated to the second UDR based on the subscriber ID;

updating the subscriber profile stored on the second UDR based on the provisioning data update, logging the provisioning data update, and triggering a synchronization update on the first UDR;

auditing the first UDR to identify a subscription alias for the subscriber profile stored on the first UDR and performing a delta update on the subscription alias based on the logged provisioning data update to synchronize the first UDR with the second UDR.

16. The non-transitory computer-readable storage media of claim 15 wherein the operations further comprise:

instantiating the second UDR;

selecting a range of subscriber IDs to migrate and transferring subscriber profiles that comprise subscriber IDs within the range from the first UDR to the second UDR;

generating subscriber aliases that correspond to the transferred subscriber profiles and storing the subscriber aliases on the first UDR; and rerouting requests for data in the transferred subscriber profiles from the first UDR to the second UDR.

17. The non-transitory computer-readable storage media of claim 16 wherein the operations further comprise:

determining when an amount of the transferred subscriber exceed a migration threshold;

when the amount of the transferred subscriber profiles exceed the migration threshold, classifying the second UDR as stable and deleting the subscriber aliases stored on the first UDR; and wherein:

the migration threshold comprises a proportion of a total amount of the subscriber profiles stored by the first UDR.

18. The non-transitory computer-readable storage media of claim 16 wherein the operations further comprise:

detecting that the second UDR is unstable;

in response, triggering a UDR fallback by converting the subscriber aliases stored on the UDR into active subscriber profiles that correspond to the transferring subscriber profiles; and rerouting additional requests for the data in the transferred subscriber profiles from the second UDR to the first UDR.

19. The non-transitory computer-readable storage media of claim 15 wherein performing the delta update on the subscription alias based on the logged provisioning data update comprises modifying the subscriber alias to match the subscriber profile.

20. The non-transitory computer-readable storage media of claim 15 wherein receiving the provisioning data update for the subscriber profile comprises receiving the provisioning data update for the subscriber profile from a Customer Relationship Management (CRM) client server.

\* \* \* \* \*